VISCOSITY CONTROL SYSTEM AND APPARATUS

Original Filed Oct. 31, 1957 3 Sheets-Sheet 1

INVENTOR.
FRANK P. THOMAS.
BY
Lockwood, Galt, Woodard & Smith
ATTORNEYS.

VISCOSITY CONTROL SYSTEM AND APPARATUS

Original Filed Oct. 31, 1957 3 Sheets-Sheet 2

INVENTOR.
FRANK P. THOMAS.

BY

Lockwood, Galt, Woodard + Smith.
ATTORNEYS.

VISCOSITY CONTROL SYSTEM AND APPARATUS

Original Filed Oct. 31, 1957 3 Sheets-Sheet 3

INVENTOR.
FRANK P. THOMAS.

BY
Lockwood, Galt, Woodard & Smith.
ATTORNEYS.

United States Patent Office

Re. 25,859
Reissued Sept. 21, 1965

25,859

VISCOSITY CONTROL SYSTEM AND APPARATUS

Frank P. Thomas, Zionsville, Ind., assignor to General Equipment Mfg. Co., Inc., Indianapolis, Ind.

Original No. 3,013,398, dated Dec. 19, 1961, Ser. No. 693,583, Oct. 31, 1957. Application for reissue Oct. 10, 1962, Ser. No. 230,314
16 Claims. (Cl. 62—136)

Matter enclosed in heavy brackets [ ] appears in the original patent but forms no part of this reissue specification; matter printed in italics indicates the additions made by reissue.

This invention relates generally to a product viscosity control system and apparatus in which an agitator motor is used as a sensing device for controlling the heat exchange to the product, thereby correcting deviations in the product viscosity. The invention is particularly described with reference to apparatus for producing and delivering soft texture ice cream. It will be understood, however, that the basic system can be used with any apparatus in which the product viscosity is to be controlled. An example of additional apparatus of the type referred to is starch hydrolyzing equipment.

In providing apparatus for the storing and intermittent dispensing of a product, such as soft texture ice cream, it is important to provide means for maintaining the homogeneous character of the product and for delivering it, when desired, at a dispensing passage or spigot. Proper operation of the refrigerating means must also be provided for maintaining the product at a proper viscosity over prolonged periods. Generally in apparatus of the type referred to, the means for maintaining the product homogeneous and for delivering the product takes the form of a dasher or agitator which extends within the chamber containing the product. The refrigerating means takes the form of a conventional mechanical refrigeration apparatus adapted to provide heat exchange between its evaporator and the product chamber. It will be apparent that in arrangements of the type under discussion, some means must be provided for sensing changes in the viscosity of the product so that the agitator and the refrigeration system may be operated to correct such deviations.

The principal object of the present invention is to provide an apparatus and control system in which the torque developed by the agitator drive motor is utilized to sense deviations in the product viscosity.

A further object of the present invention is to provide an apparatus and system wherein opening of the product delivery passage actuates the agitator drive motor and the compressor motor for the refrigeration means, these motors remaining energized until the viscosity of the product is at the desired value as indicated by the development of a predetermined torque at the agitator drive motor.

A further object of the invention is to provide an apparatus and system wherein both the agitator motor and the compressor motor are shut down by any one of a plurality of overload devices.

A further object of the present invention is to provide an ice cream making apparatus wherein, once the agitator motor and the compressor motor are energized, their deenergization is completely under control of a switch responsive to the torque developed by the agitator motor.

A further object of the present invention is to provide an apparatus and system of the type referred to above wherein means are provided for periodically energizing the agitator motor and the refrigeration compressor motor during the prolonged periods when no product delivery is required.

A further object of the present invention is to provide an apparatus and system of the type referred to above, in which means are provided for energizing the agitator motor independently of the refrigeration compressor motor to thereby facilitate the clean-out of the apparatus.

The full nature of the invention will be understood from the accompanying drawings and the following description and claims:

Figure 1:
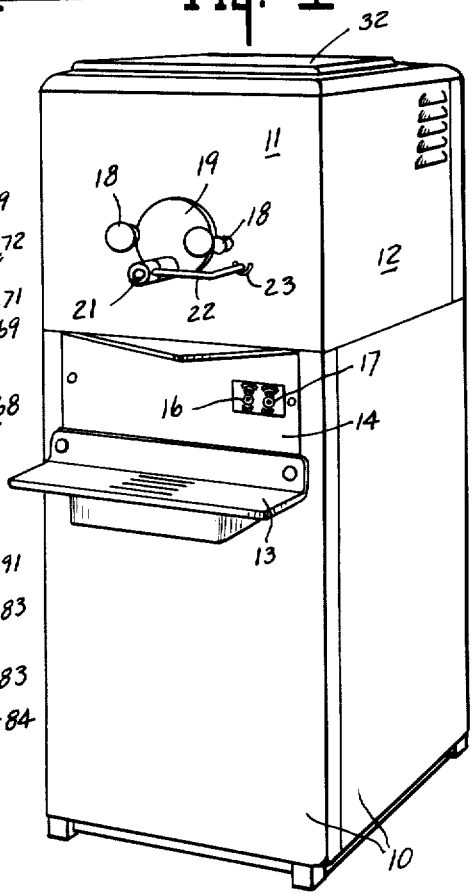
FIG. 1 is a perspective view of an ice cream dispensing apparatus embodying the present invention.

Referring initially to FIG. 1, it may be seen that the ice cream dispensing apparatus is generally rectangular in configuration, having lower panels 10 and an upper housing including a front plate 11, and side plates 12. The front panel mounts a drainage or overflow ledge 13 and a control panel 14. The control panel serves to mount a manually operated agitator toggle switch 16 and a similar "auto" switch 17 whose function will be subsequently described. The front panel of the upper housing mounts clamps 18 which support a closure 19. The closure accommodates a delivery spigot 21 which extends therethrough, the spigot providing a discharge passage (not shown) at its base. The spigot is provided with a sidewardly extending handle 22 having a rearwardly bent portion which is adapted, when raised, to actuate a linkage 23 which operates a handle switch whose function will be subsequently described. It will be understood that an upward movement of the handle imparting limited rotary movement to the spigot serves both to open the delivery passage and to actuate the handle switch linkage.

Figure 5:
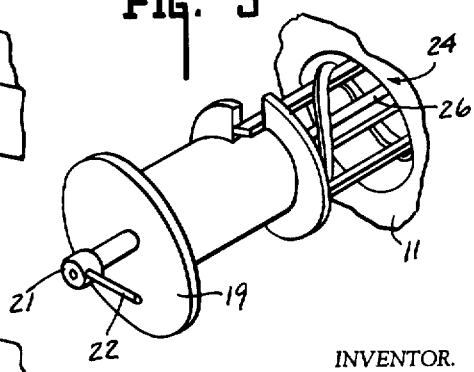
FIG. 5 is a fragmentary perspective view of the agitator subassembly.
Figure 2:
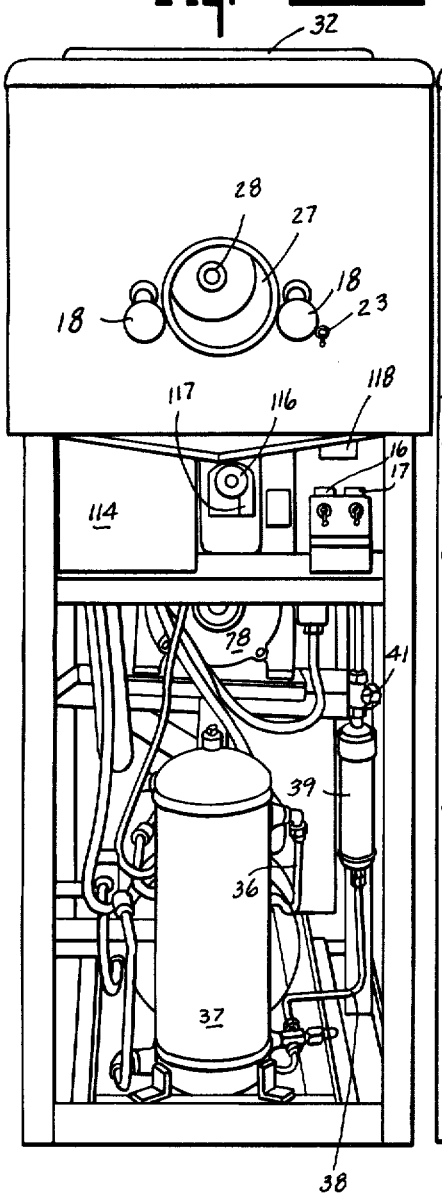
FIG. 2 is a front view of the apparatus with certain of the enclosure panels removed to better show the components.

Referring to FIGS. 2 and 5, it may be seen that the plate 19 mounts a spiral agitator *or paddle means* indicated generally at 24. The agitator includes a central shaft 26 and, when the plate 19 is clamped in place, the agitator assembly extends longitudinally through a tubular product-receiving chamber 27 (FIG. 2), with the aperture 28 in the rear wall of the chamber accommodating the agitator shaft. The agitator assembly is not described in complete detail herein since its specific construction forms no part of the present invention.

Figure 3:
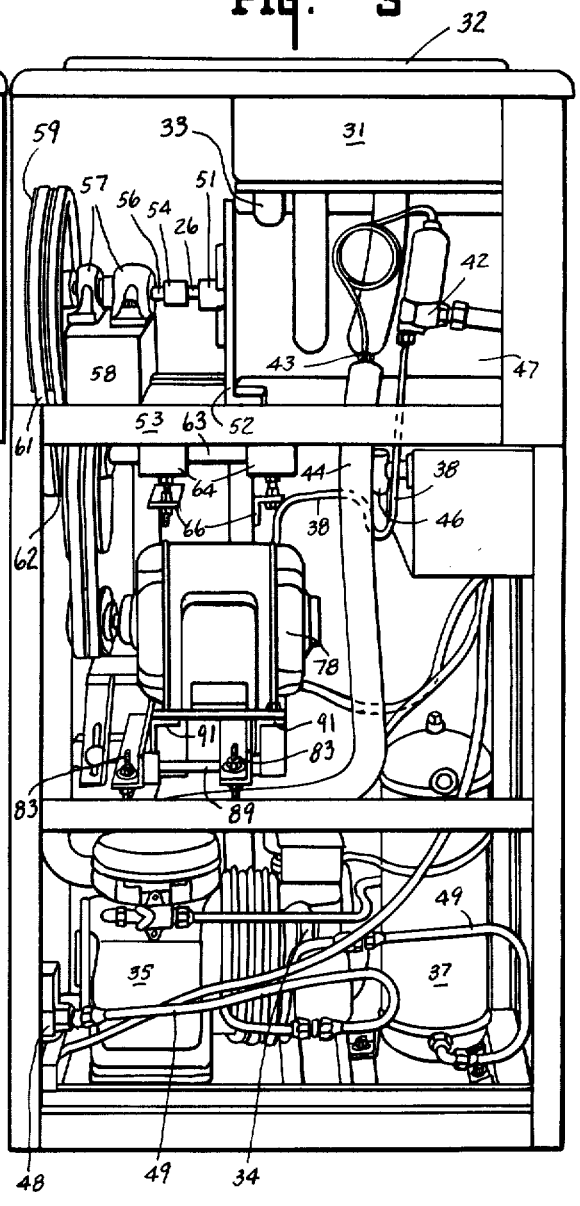
FIG. 3 is a left-hand side view of the apparatus shown in FIG. 2.

As may be seen in FIG. 3, the top plate 29 of the apparatus mounts a thermally insulated mix pan or mix-receiving chamber 31 to which entry may be had by means of the removable closure 32. The mix-receiving chamber has communication with the interior of the product chamber by means of a duct 33.

The refrigeration apparatus for cooling the product chamber will now be described with reference to FIGS. 2 and 3. The refrigeration system is of the conventional, mechanical refrigerating type having a compressor 34 driven by a compressor drive motor 35. The high side of the compressor is connected by means of a line 36 to a conventional, water-cooled condenser-receiver 37. The liquid line 38 from the condenser-receiver has conventionally interposed therein a dehydrator 39 and a liquid indicator 41. As may best be seen in FIG. 3, the liquid line is connected to a conventional expansion valve 42, having a sensing bulb 43 positioned at the return line 44 which returns refrigerant to the compressor. A solenoid valve 46 is also interposed in the liquid line between the dehydrator and the expansion valve. With the refrigerating system in operation, the expansion valve conventionally admits refrigerant to the evaporator whose coils (not shown) encircle the mix pan and the product chamber and are covered by thermal insulation 47. A control valve 48 may be used to provide for the admission of cooling water to the water line 49 which is conventionally arranged to remove heat from the compressor and the condenser of the refrigerating system.

The drive means for the agitator and the arrangement of the torque responsive means will now be described with particular reference to FIGS. 3 and 4. As may be seen in FIG. 3, the shaft 26 of the agitator assembly extends through a bearing 51 carried by the rear wall of the product chamber which, in turn, is supported by a plate 52 carried on horizontal frame members 53. The outer end of the shaft 26 is coupled at 54 to a shaft 56. Shaft 56 is mounted for rotation by means of bearing members 57 supported on stanchion 58. At its outer end the shaft 56 has keyed thereto a driven pulley 59 which is linked by means of the V-belts 61 to a pulley 62. The pulley 62 is keyed to a jackshaft 63 which is mounted for rotation by means of bearing members 64 supported on cross bars 66.

Figure 4:
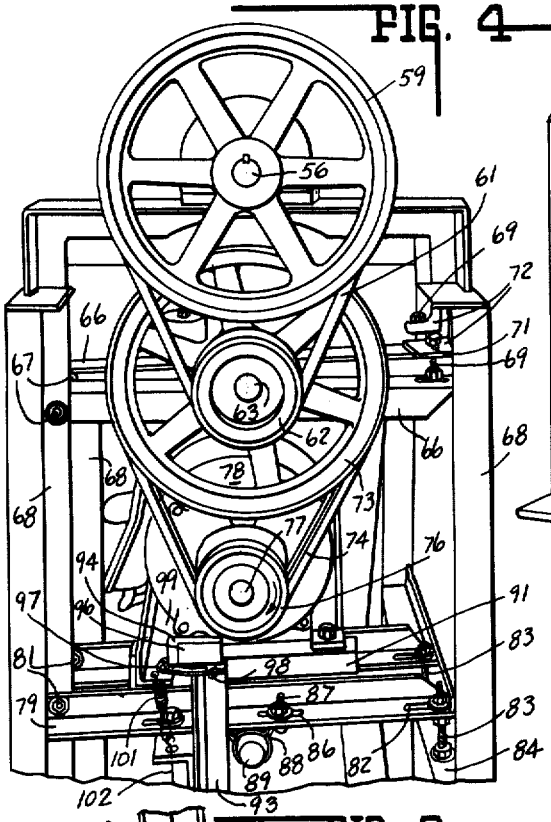
FIG. 4 is an enlarged view of a portion of the apparatus shown in FIG. 3.

As may best be seen in FIG. 4, the cross bars are rigidly secured together and are pivotally supported at 67 on the vertical frame members 68. The opposite ends of the cross bars are provided with bolts 69 which extend through transverse slots 71 in angle members 72 rigidly secured to the adjacent vertical frame member 68. It will be evident that by adjusting the position of the terminal nuts carried by the bolts, the cross bars may be pivotally positioned to provide belt tightening adjustment between the pulley 62 and the driven pulley or wheel 59.

The jackshaft additionally carries keyed thereto a large wheel or pulley 73 connected by means of V-belts 74 to a pulley 76 keyed to the drive shaft 77 of the agitator drive motor 78.

The mounting means for the drive motor includes a platform formed by cross bars 79 which are pivotally mounted at 81 to the upright support member 68. The opposite ends of the cross bars 79 are provided with slots 82 accommodating bolts 83 which, at their lower ends, rest upon the surface of an angle iron 84. The bolts 83 thus provide a means for adjusting the tension of belts 74 by adjustably determining the pivotal position of the cross bars 79. Each of the cross bars 79 is provided with appropriately spaced slots 86 which accommodate bolts 87 serving to support bearing brackets 88. The bearing brackets serve to support for limited rotation a shaft 89 which extends transversely of and in depending relation to the cross bars 79. The agitator drive motor is secured to a base formed by parallel angle irons 91 which are pivotally supported on the shaft 89 by means of depending members 92 which have apertures therein accommodating the shaft.

As may best be seen in FIG. 4, the platform provided by the cross bars 79 has rigidly secured thereto an angle iron assembly 93 which supports a plate 94 on which is mounted a totally enclosed, normally closed snap switch 96. The snap switch has a conventional thrust pin (not shown) adapted to be actuated by an actuating member 97 pivotally supported at 98. The end of the actuating member rests against the adjacent surface of an angle iron 99 which is rigidly attached to the members 91 and consequently to the agitator drive motor housing. A tension spring 101 is secured to the angle iron 99 and to a Bowden wire 102 which terminates at a point of adjustment (not shown) at which the adjustment of the tension of the spring may conveniently be made.

With the agitator drive motor in operation and the agitator being rotated thereby through the above described pulleys ,as long as the ice cream mixture within the chamber 27 is relatively thin, the drive motor will be supported as shown in FIG. 4. In this position, although the switch actuating member 97 bears against the angle iron 99, the actuating member is not positioned upwardly sufficient to actuate the switch. As the material in the chamber 27 thickens, the torque exerted by the motor in turning the agitator increases,. As this increase in torque occurs, the reactive forces of the belts on the pulley 76 are such as to cause the pulley 76 to tend to climb the right-hand section of the belt 74. In other words, as the load on the motor increases the motor housing tends to rotate clockwise with the motor drive shaft 77 in accord with conventional dynamometer principles. This tendency for the motor housing to rotate as the torque developed by the motor increases results in a tilting of the motor supports 91 about the shaft 89, this tilting movement being resisted by tension spring 101. When the motor torque has reached a predetermined value, indicating that the material in the chamber 27 is at the desired viscosity, the motor supports 91 will have been tilted clockwise about shaft 89 sufficient to cause the member 99 to actuate switch 96 to open position. It may thus be seen that the switch 96 will be maintained in closed position until the material in the chamber 27 is at the desired viscosity, whereupon switch 96 will be actuated to open position.

The adjustable tension spring 101 provides a means for varying the torque, and consequently the product viscosity or consistency required to open the switch 96. It will be noted that in order to maintain the spring 101 effective to provide this adjustment, it must at all times resist the weight of the motor. To maintain the direction of forces thus required, the centers of shafts 56, 63 and 77 must lie on a single straight line which is either vertical or inclined to the right of vertical, as viewed in FIG. 4.

Figure 6:
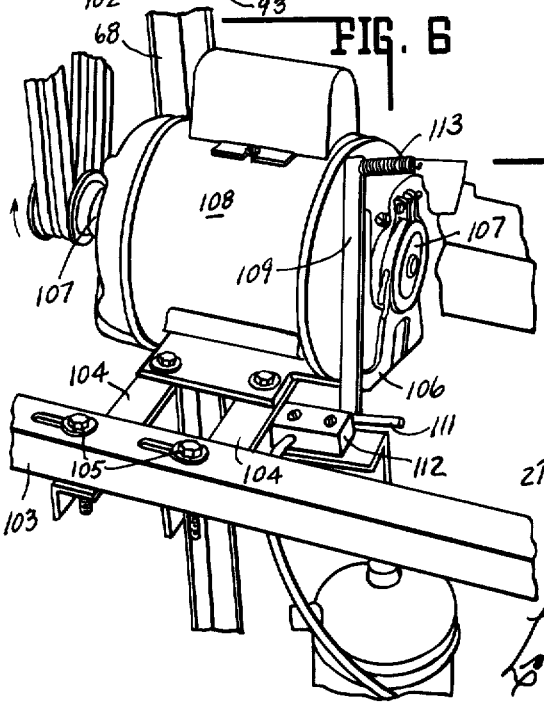
FIG. 6 is an enlarged perspective view of a modified form of the torque switch actuating mechanism.

A modified form of the torque control switch apparatus is shown in FIG. 6. As there shown, the stationary transverse frame members 103 carry spaced angle irons 104 rigidly secured thereto by bolts 105. A generally U-shaped cradle member or support 106 is bolted to the members 104 and, by means of bronze bushings 107, supports the agitator drive motor 108. The bronze bushings provide a means for cradling or supporting the motor so that the motor housing is free to rotate relative to the support 106. A bracket 109 is rigidly supported on the motor housing and its lower end extends adjacent the switch actuating member 111. The switch actuating member serves to operate the switch 112, identical to switch 96 previously described, when moved by the bracket 109.

In operation, as the drive motor rotates the agitator within the chamber 28, the torque developed by the motor increases as the consistency of the material in the chamber increases. When the material has reached the desired viscosity, the torque developed by the motor 108 will be such as to produce a reaction which rotates the motor housing sufficiently to cause bracket 109 to actuate switch 112 to open position. A consistency control spring, taking the form of tension spring 113, acts to resist this switch actuating motion of the bracket 109 and serves a function identical to that provided by spring 101 of FIG. 4 in providing a consistency or viscosity adjustment for the material in the chamber 27. This form of the torque switch assembly, while operating in substantially identical fashion to the form of FIG. 4, is characterized by increased sensitivity as compared to the arrangement of FIG. 4.

The control circuit for the apparatus referred to above will now be described. As may be seen in FIG. 2, the control circuit components include starters for the agitator drive motor and for the compressor motor indicated generally at 114. The circuit components also include a timer motor 116 and a switch 117 operated thereby. The circuit also includes the agitator switch 16 and the auto switch 17. A handle switch 118 also forms part of the circuit and is actuated from normally open to closed position by the linkage 23 which is actuated by the spigot handle 22. It will be evident that the physical location of the aformentioned circuit components is generally indicated in FIG. 2; however, their circuit interconnections are shown in the schematic circuit diagram of FIG. 7.

Figure 7:
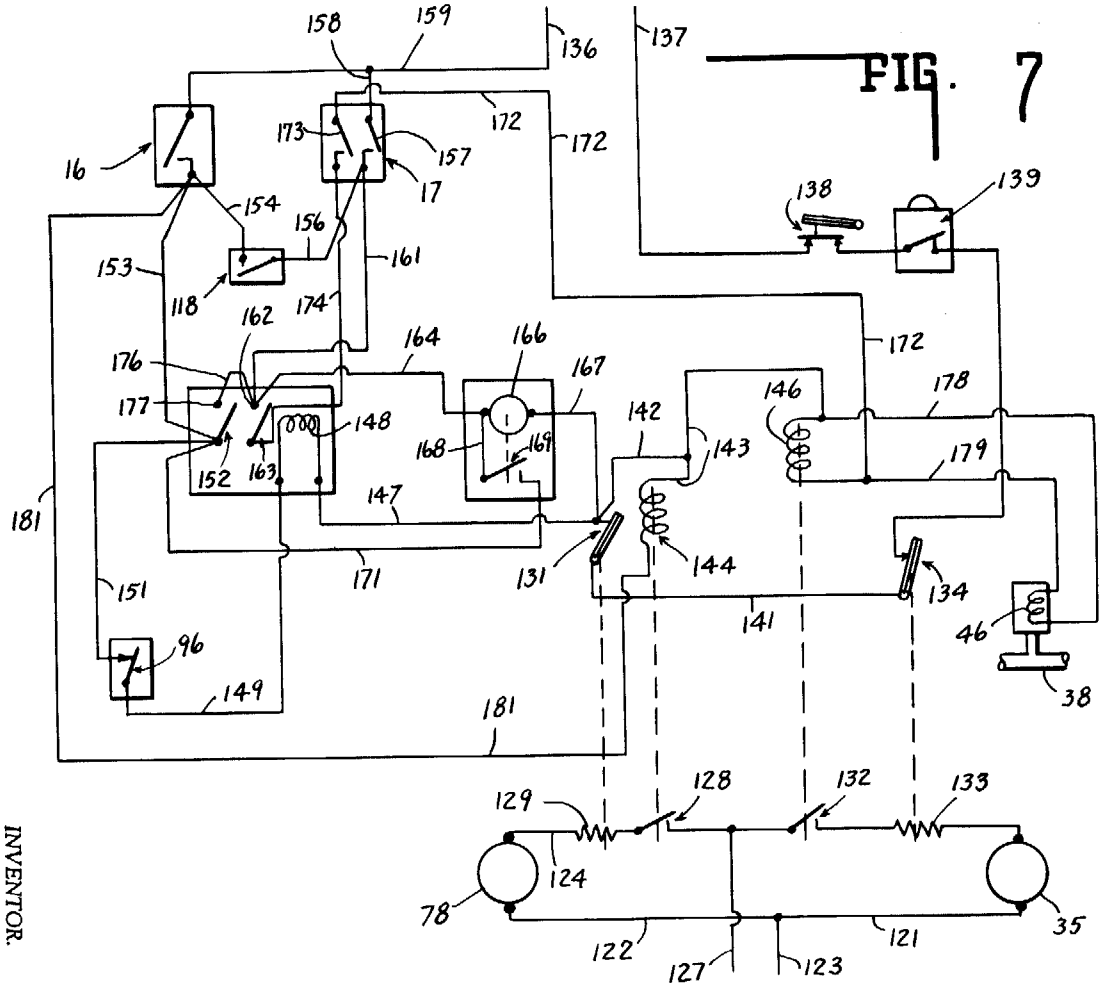
FIG. 7 is a schematic circuit diagram for the apparatus.

Referring to FIG. 7, it may be seen that the motor 35 includes wires 121 and 122 which are mutually connected to a power wire 123. Wires 124 and 126 serve to connect the two motors to the other power wire 127. Interposed in the wire 124 is a relay operated switch 128 and the heating coil 129 which serves to open a bimetal operated overload switch 131 in the control circuit to be subsequently described. Similarly, a relay switch 132 and a heating coil 133 are interposed in the wire 126, the heating coil 126 serving to operate the bimetal overload switch 134. It will be understood that the heating coils and their associated switches 131 and 134 diagrammatically illustrate conventional thermal overload relays, and that if three phase power were used to energize the agitator and the compressor motors, additional overload relays would be required. From the foregoing it should be evident that with the connection of power wires 127 and 123 to a source of electrical power, the agitator and compressor motors will be energized upon closure of switches 128 and 132, respectively.

The control circuit for operation of the switches 128 and 132 includes power wires 136 and 137 which may be connected across a suitable source of control power. Serially interposed in wire 137 are an overload switch 138 and a high pressure cutout switch 139. Overload switch 138 is of the conventional "Klixon" type and is associated with the compressor motor so as to open its contacts upon the occurrence of an overload in the compressor motor. The switch 139 includes a pressure sensing device responsive to the compressor head pressure and is of a conventional type. The terminus of wire 137 is connected to one side of switch 134 which has its other side connected to a wire 141. Wire 141 is connected at its other end to one side of switch 131, which has its other terminal connected to a wire 142 which, in turn, is connected to wire 143 which is common to one side of an agitator motor starter coil 144 and a compressor motor starter coil 146, the starter coils thus being connected in series-parallel relation with their adjacent circuit components. As indicated diagrammatically in FIG. 2, the starter coils 144 and 146, when energized, function to close the switches 128 and 132, respectively.

The wire 147 is connected to one side of the switch 131 and at its opposite end is connected to a relay coil 148. The other end of relay coil 148 is connected by means of a wire 149 to one side of the normally closed torque responsive switch 96 whose operation was previously described with reference to FIG. 4. The other side of switch 96 is connected by means of wire 151 to the movable contact of a relay coil operated switch 152. This same terminal of the switch 152 is connected by means of the wire 153 to one side of the agitator switch 16. This same terminal of the agitator switch is connected by means of a wire 154 to one side of the handle switch 118, mentioned in reference to FIG. 2. The other side of the handle switch is connected by means of a wire 156 to one terminal of a switch 157 which forms a portion of the double pole auto switch generally referred to by the reference numeral 17. The other side of the switch 157 is connected by means of wire 158 to a wire 159, which, in turn, is connected to the power wire 136.

The fixed contact of switch 157 (which is one of the switches included in the double throw auto switch 17) is connected by a wire 161 to one terminal 162 of a second relay operated switch 163. Terminal 163 is further connected by means of a wire 164 to one side of a timer motor 166. The other side of the timer motor is connected by means of wire 167 to the wires 142 and 147 at the fixed contact terminal of thermal overload switch 133.

A wire 168 connects wire 164 to one side of a switch 169 operated by the timer motor, the other side of the timer switch being connected by means of wire 171 to wire 153 at the terminal for the movable contact of the relay operated switch 152. The timer motor 166 is adapted to close the switch 169 every ten minutes for a period of fifteen seconds and thereby establishes an energizing circuit for relay 163 which is independent of handle switch 118, as will subsequently be explained.

A wire 172 connects one side of compressor motor starter coil 146 to the movable contact of switch 173, which forms one switch of the double pole auto switch indicated at 17. The fixed contact terminal of switch 173 is connected by means of wire 174 to the movable contact terminal of relay operated switch 163. The fixed contact terminal 162 of switch 163, in addition to carrying wires 161 and 164 further accommodates a jumper wire 176 which connects to the fixed contact terminal 177 of relay operated switch 152.

The refrigerant flow controlling solenoid valve 46 has its operating coil connected in parallel across the compressor starting coil 146 by means of wires 178 and 179.

Wire 159, previously mentioned as joining power line 136 to switch 157, is also connected to the movable contact terminal of manually operated agitator switch 16. The opposite terminal of switch 16 is connected by means of wire 181 to one side of the agitator motor starter coil 144. The circuit for the agitator starter coil provided by wire 159, switch 16, and wire 181 is independent of the relay coil and the torque switch 96 and thereby provides a means for energizing the agitator during cleanout of the apparatus as will subsequently be described.

In operation, with a material such as a semi-fluid ice cream mix ready for serving filling the chamber 27, the double pole auto switch 17 may be closed, closing switches 173 and 157. The agitator switch 16 remains open, as does the handle switch 118. Under these static conditions the torque switch 96 is in deactuated position. With a confection cup or other container at the spigot 21, the handle switch may be closed by an upward movement of the handle 22. Closure of the handle switch 118 thereupon energizes the relay coil 148 by means of a circuit which may be traced from wire 136, wire 158, switch 157, handle switch 118, wire 154, wire 153, wire 151, torque switch 96, wire 149, relay coil 148, wire 147, overload switch 131, wire 141, overload switch 134 and to the other power line 137 through the high pressure cutout switch 139 and the compressor motor overload switch 138. Energization of relay coil 148 closes its switches 152 and 163. Closure of switch 163 completes a circuit to the compressor starter coil 146 through a circuit which may be traced as follows: From wire 136, wire 159, wire 158, switch 157, wire 161, relay switch 163, wire 174, switch 173, wire 172, compressor starter coil 146, wire 143, wire 142, overload switch 131, wire 141, overload switch 134 and back to wire 137, the other side of power, through the high pressure cutout switch 139 and the compressor overload switch 138. Energization of the compressor starter coil 146 closes its switch 132 which thereupon completes a power circuit to the compressor motor 35 by means of wires 121 and 126 which are connected to power lines 127 and 123. The solenoid valve 46 is also opened upon energization of coil 146 by means of wires 178 and 179, energization of the solenoid valve permitting the flow of refrigerant through the liquid line 38.

Closure of the handle switch 118 also energizes the agitator motor starting coil 144 through a circuit which may be traced as follows: Wire 136, wire 158, switch 157, wire 156, wire 154, wire 181, agitator starter coil 144, wire 142, overload switch 131, wire 141, overload switch 134 and back to wire 37 through the overload switches 138 and 139. Energization of the coil 144 closes its switch 128 which connects the agitator motor 78 to the power lines 123 and 127 by means of wires 122 and 124. Closure of the handle switch thus starts rotation of the agitator 26 and starts the operation of the refrigerating system.

It will be noted that energization of relay coil 148 by closing switch 152 sets up a holding circuit for the relay coil which is independent of the handle switch. This holding circuit may be traced from wire 136, wire 158, switch 157, wire 161, jumper wire 176, relay terminal 177, relay switch 152, wire 151, torque switch 96, wire 149, relay coil 148, wire 147, overload switch 131, wire 141, overload switch 134 and back to wire 137 through the overload switches 138 and 139. With this holding circuit established, it may be seen that the relay coil cannot again be de-energized until the torque switch 96 opens, indicating that the material in the chamber 27 is at the proper consistency. The relay, while energized, maintains an energizing circuit for the agitator starter coil 144 through switch 152 and wire 153 which is connected to wire 181. Thus, upon initial energization of the agitator and the compressor by handle switch 118, these two units will continue to run until the relay coil 148 is de-energized by opening of torque switch 96.

In order to maintain the proper consistency of the mixture over what may be prolonged periods in which the handle switch 118 remains open, timer motor operated switch 169 is effective to periodically trigger the control circuit so that both the agitator and compressor motors operate to adjust the consistency of the material in chamber 27. The energizing circuit for the timer motor 166 is closed upon the manual closing of the auto switch 157. This energizing circuit may be traced from wire 136, wire 158, switch 157, wire 161, terminal 162, wire 164, timer motor 166, wire 167, and through overload switches 131, 134, 138 and 139 back to wire 137. Closure of the timer motor operated switch 169 provides power to the torque switch 96 to energize relay coil 148, resulting in the starting of the agitator and compressor motors. This last-mentioned circuit may be traced as follows: Wire 136, wire 158, switch 157, wire 161, terminal 162, wire 164, wire 168, switch 169, wire 171, wire 151, torque switch 96 by means of wire 149 to the relay coil 148. Closure of switch 152 upon energization of the relay coil closes the afore-mentioned holding circuit so that the relay coil, and consequently the agitator and compressor motors will remain energized until torque switch 96 opens. The timer motor may be set to close its switch 169 at any desired interval, the preferred setting for the timer being such that the timer switch is closed every ten minutes for a period of fifteen seconds. If the consistency of the material in chamber 28 is at the desired value, causing torque switch 96 to immediately open, the agitator and compressor motors will operate only during the fifteen second period in which the switch 169 is closed and will shut down at the termination of this fifteen second period.

From the foregoing and by inspection of FIG. 7, it may be seen that the control circuit described provides several important features. The first of these features provides that the operation of the apparatus for all conditions except "clean out" is controlled by one switch. This switch is the double-pole, auto switch 17 which is mounted on the control panel 14 of the assembled apparatus. From FIG. 7 it may be seen that the component switch 157 of the auto switch 17 connects one side of the power to the control relay contacts and the handle switch 118 by means of wires 161 and 156 and thereby controls the operation of the complete apparatus.

Another feature of the circut enables any one of the safety devices, such as switches 131, 134, 138 and 139 to shut down both the compressor and agitator motors. This is accomplished by connecting the compressor overload switch 138, high pressure cutout switch 139 and each of the starter overload switches 131 and 134 in series to one side of power and feeding the basic control circuit from the end of this series arrangement which occurs at the fixed contact terminal of overload switch 131. Operation of any one of these safety devices thus shuts down the complete apparatus by removing the control circuit from one side of the power supply. Note should be taken of the importance of providing the agitator overload switch 131 in the control circuit. If this overload switch 131 were not connected as shown in the control circuit and the agitator motor were stalled due to a consistency or viscosity setting beyond the designed range of the motor, it may be seen that the timer would complete the relay circuit, and since no agitator motor torque would be available to operate the torque switch 96, the control would run until shut off manually by opening the auto switch 17. If this condition were undetected for fifteen minutes or more, the material in chamber 28 would be frozen solid therein, this condition requiring several hours to put the apparatus back into normal operation.

A further feature of the described circuit provides that the operation of the apparatus is completely under the control of the consistency measuring torque switch 96 once the control circuit has been energized. The starting impulse in the control circuit is obtained by closing either the handle switch 118 or the timer switch 169, thus completing the circuit to the control relay through the torque switch. Closing of the control relay switch 152, as previously mentioned, creates a self-holding relay coil circuit also through the torque switch 96 which can only be interrupted by opening of the torque switch. Thus, even though the handle switch or timer switch are closed only momentarily, power is supplied to both the agitator starter coil 144 and the compressor starter coil 146.

Both motors will continue to run until the torque switch 96 opens, indicating proper product consistency. Opening of the torque switch opens the control relay circuit and shuts down both the agitator and compressor motors. When the agitator stops and the torque switch re-closes, the control relay coil 148 cannot be re-energized until either the handle switch 118 or the timer switch 169 again applies power to the torque switch. Full automatic operation is obtained since every time that the material or product is drawn from the spigot, the handle switch is closed, thereby operating both the agitator and the compressor. If the product consistency causes the torque switch 96 to open while the product is being withdrawn, the agitator motor will continue to operate with its starter coil 144 powered through the handle switch 118 and through wires 154 and 181. The torque switch will consequently adjust the compressor operation to the rate of product withdrawal.

A further feature of the described circuit permits operation of the agitator motor for cleanout purposes without operating the compressor. This is arranged by use of the manually-operated agitator switch 16 which applies power to the entire control circuit through wires 159 and 153. The compressor is prevented from running during the cleanout period by opening the auto switch 17. The consequent opening of component switch 157 interrupts power at wires 158 and 161 to prevent energization of the compressor starter coil 146 and also prevents feed back through the control relay by also interrupting the circuit between wires 174 and 172 at component switch 173.

It will be noted that while the circuit of FIG. 7 has been described as having a torque switch 96 of FIG. 4 incorporated therein, the operation of the circuit would be the same if the torque switch 112 of FIG. 6 were incorporated therein.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A system for controlling the viscosity of material within a heat exchange chamber, including electrically energizable means associated with said chamber for altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first switch controlling the energization of said agitator drive motor and said electrically energizable means, a second switch controlling the de-energization of said drive motor and said electrically energizable means, and a member movable in response to a predetermined torque developed by said agitator drive motor adapted to operate said second switch, whereby after energization of the drive motor and the electrically energizable means by operation of said first switch said material must attain a viscosity evidenced by development of said predetermined torque at said drive motor before said second switch is operated to de-energize said drive motor and said electrically energizable means.

2. A system for controlling the viscosity of material within a heat exchange chamber, including electrically energizable refrigerating means associated with said chamber for lowering the temperature and altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first manually operated, normally open switch controlling the energization of said agitator drive motor and said electrically energizable means, a second normally closed switch controlling the de-energization of said drive motor and said electrically energizable means, and a member movable in response to a predetermined torque developed by said agitator drive motor adapted to operate said second switch, whereby after energization of the drive motor and the electrically energizable means by operation of said first switch said material must attain a viscosity evidenced by development of said predetermined torque at said drive motor before said second switch is operated to de-energize said drive motor and said electrically energizable means.

3. A system for controlling the viscosity of material within a heat exchange chamber, including electrically energizable means associated with said chamber for altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first switch controlling the energization of said agitator drive motor and said electrically energizable means, a second switch controlling the de-energization of said drive motor and said electrically energizable means, and a member movable in response to a predetermined torque developed by said agitator drive motor adapted to operate said second switch, whereby after energization of the drive motor and the electrically energizable means by operation of said first switch said material must attain a viscosity evidenced by development of said predetermined torque at said drive motor before said second switch is operated to de-energize said drive motor and said electrically energizable means, and a timer operated switch connected in parallel with said first switch adapted to energize said drive motor and said electrically energizable means at periodic intervals independently of said first switch.

4. A system for controlling the viscosity of material within a heat exchange chamber, including electrically energizable refrigerating means associated with said chamber for lowering the temperature and altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first manually operated, normally open switch controlling the energization of said agitator drive motor and said electrically energizable means, a control relay energized by closure of said first switch, a hold-in switch closed upon energization of said control relay to maintain the energization of the control relay independently of the subsequent opening of said first switch, a second normally closed switch in series with said relay hold-in switch thereby controlling the de-energization of said drive motor and said electrically energizable means, and a member movable in response to a predetermined torque developed by said agitator drive motor adapted to operate said second switch, whereby after energization of the drive motor, the control relay, and the electrically energizable means by operation of said first switch said material must attain a viscosity evidenced by development of said predetermined torque at said drive motor before said second switch is operated to de-energize said control relay and consequently said drive motor and said electrically energizable means.

5. A system for controlling the viscosity of material within a heat exchange chamber, including electrically energizable means associated with said chamber for altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first switch controlling the energization of said agitator drive motor and said electrically energizable means, a second switch controlling the de-energization of said drive motor and said electrically energizable means, and a member movable in response to a predetermined torque developed by said agitator drive motor adapted to operate said second switch, whereby after energization of the drive motor and the electrically energizable means by operation of said first switch said material must attain a viscosity evidenced by development of said predetermined torque at said drive motor before said second switch is operated to de-energize said drive motor and said electrically energizable means, a timer operated switch connected in parallel with said first switch adapted to energize said drive motor and said electrically energizable means at periodic intervals independently of said first switch, and a third manually operated switch connected in parallel with said first and second switches for energizing said agitator drive motor for cleanout of said heat exchange chamber.

6. In combination, an apparatus for delivering a frozen comestible product at a uniform desired viscosity including a chamber containing the product and having a normally closed delivery passage therein, refrigerating means for removing heat from said chamber, including a compressor motor, an agitator mounted for rotation within said chamber to maintain said product homogenous and to deliver it through said delivery passage when open, an agitator drive motor adapted to rotate said agitator, a control circuit for connecting a source of power to said drive motor and said compressor, said control circuit including a drive motor starter coil and a compressor motor starter coil connected in series-parallel relation with their common side being connected to one side of an electrical power source, a control switch adapted to be operated upon the opening of said delivery passage, the other side of said drive motor starter coil being connected to the opposite side of said power source through said control switch, a control relay coil having first and second switches operated thereby, the other side of said compressor motor starter coil being connected to the other side of said power source through said second relay switch, a normally closed torque switch adapted to be opened in response to a predetermined torque developed by said drive motor, said torque switch and said relay coil being series connected across said power source through said control switch, said first relay coil operated switch acting as a hold-in switch when said relay coil is energized to connected said drive motor starting coil and said series connected torque switch and relay coil across said source of power independently of said control switch, whereby upon operation of said control switch said drive motor starter coil is energized to operate said agitator and said compressor motor starter coil is energized to operate said refrigerating means, said starter coils remaining energized until said torque switch is opened by the development of said predetermined torque at the drive motor indicating said comestible product is at the desired viscosity.

7. In combination, an apparatus for delivering a frozen product at a uniform desired viscosity including a chamber containing the product and having a normally closed delivery passage therein, refrigerating means for removing heat from said chamber, including a compressor motor, an agitator mounted for rotation within said chamber to maintain said product homogenous and to deliver it through said delivery passage when open, an agitator drive motor adapted to rotate said agitator, a control circuit for connecting a source of power to said drive motor and said compressor, said control circuit including a drive motor starter coil and a compressor motor starter coil connected in series-parallel relation with their common side being connected to one side of an electrical power source, a control switch adapted to be operated upon the opening of said delivery passage, the other side of said drive motor starter coil being connected to the opposite side of said power source through said control switch, a control relay coil having first and second switches operated thereby, the other side of said compressor motor starter coil being connected to the other side of said power source through said second relay switch, a normally closed torque switch adapted to be opened in response to a predetermined torque developed by said drive motor, said torque switch and said relay coil being series connected across said power source through said control switch, said first relay coil operated switch acting as a hold-in switch when said relay coil is energized to connected said drive motor starting coil and said series connected torque switch and relay coil across said source of power independently of said control switch, whereby upon operation of said control switch said drive motor starter coil is energized to operate said agitator and said compressor motor starter coil is energized to operate said refrigerating means, said starter coils remaining energized until said torque switch is opened by the development of said predetermined torque at the drive motor indicating said product is at the desired viscosity, and normally closed overload switches opening in response to overloads at either said drive motor or said compressor motor, said overload switches being series connected between the said common side of said starter coils and said one side of the electrical power source whereby opening of any one of said overload switches de-energizes said control circuit.

8. In combination, an apparatus for delivering a frozen product at a uniform desired viscosity including a chamber containing the product and having a normally closed delivery passage therein, a refrigerating means for removing heat from said chamber, including a compressor motor, an agitator mounted for rotation within said chamber to maintain said product homogenous and to deliver it through said delivery passage when open, an agitator drive motor adapted to rotate said agitator, a control circuit for connecting a source of power to said drive motor and said compressor, said control circuit ininclude a drive motor starter coil and a compressor motor starter coil connected in series-parallel relation with their common side being connected to one side of an electrical power source, a normally open control switch adapted to be closed upon the opening of said delivery passage, the other side of said drive motor starter coil being connected to the opposite side of said power source through said control switch, a control relay coil having first and second switches closed when the relay coil is energized, the other side of said compressor motor starter coil being connected to the other side of said power source through said second relay switch, a normally closed torque switch adapted to be opened in response to a predetermined torque developed by said drive motor, said torque switch and said relay coil being series connected across said power source through said control switch said first relay coil operated switch acting as a hold-in switch when closed to connect said drive motor starting coil and said series connected torque switch and relay coil across said source of power independently of said control switch, whereby upon operation of said control switch said drive motor starter coil is energized to operate said agitator and said compressor motor starter coil is energized to operate said refrigerating means, said starter coils remaining energized until said torque switch is opened by the development of said predetermined torque at the drive motor indicating said product is at the desired viscosity.

9. In combination, an apparatus for delivering a frozen comestible product at a uniform desired viscosity including a chamber containing the product and having a normally closed delivery passage therein, a refrigerating means for removing heat from said chamber, including a compressor motor, an agitator mounted for rotation within said chamber to maintain said product homogenous and to delivery it through said delivery passage when open, an agitator drive motor adapted to rotate said agitator, a control circuit for connecting a source of power to said drive motor and said compressor, said control circuit including a drive motor starter coil and a compressor motor starter coil connected in series-parallel relation with their common side being connected to one side of an electrical power source, a control switch adapted to be operated upon the opening of said delivery passage, the other side of said drive motor starter coil being connected to the opposite side of said power source through said control switch, a control relay coil having first and second switches operated thereby, the other side of said compressor motor starter coil being connected to the other side of said power source through said second relay switch, a normally closed torque switch adapted to be opened in response to a predtermined torque developed by said drive motor, said torque switch and said relay coil being series connected across said power source through said control switch said first relay coil operated switch acting as a hold-in switch when said relay coil is energized to connect said drive motor starting coil and said series connected torque switch and relay coil across said source of power independently of said control switch, whereby upon operation of said control switch said drive motor starter coil is energized to operate said agitator and said compressor motor starter coil is energized to operate said refrigerating means, said starter coils remaining energized until said torque switch is opened by the development of said predetermined torque at the drive motor indicating said comestible product is at the desired viscosity, and a manually operated clean out switch connected in parallel with said control switch and said torque switch for energizing said agitator drive motor to facilitate clean out of said product containing chamber.

10. In combination, an apparatus for delivering a frozen comestible product at a uniform desired viscosity including a chamber containing the product and having a normally closed delivery passage therein, refrigerating means for removing heat from said chamber, including a compressor motor, an agitator mounted for rotation within said chamber to maintain said product homogenous and to deliver it through said delivery passage when open, an agitator drive motor adapted to rotate said agitator, a control circuit for connecting a source of power to said drive motor and said compressor, said control circuit including a drive motor starter coil connected in series-parallel relation with their common side being connected to one side of an electrical power source, a control switch adapted to be operated upon the opening of said delivery passage, the other side of said drive motor starter coil being connected to the opposite side of said power source through said control switch, a control relay coil having first and second switches operated thereby, the other side of said compressor motor starter coil being connected to the other side of said power source through said second relay switch, a normally closed torque switch adapted to be opened in response to a predetermined torque developed by said drive motor, said torque switch and said relay coil being series connected across said power source through said control switch said first relay coil operated switch acting as a hold-in switch when said relay coil is energized to connect said drive motor starting coil and said series connected torque switch and relay coil across said source of power independently of said control switch, whereby upon operation of said control switch said drive motor starter coil is energized to operate said agitator and said compressor motor starter coil is energized to operate said refrigerating means, said starter coils remaining energized until said torque switch is opened by the development of said predetermined torque at the drive motor indicating said comestible product is at the desired viscosity, a timer operated switch connected in parallel with said control switch adapted to energize said starter coils at periodic intervals independently of said control switch, and a manually operated clean out switch connected in parallel with said control switch and said torque switch for energizing said agitator drive motor to facilitate clean out of said product containing chamber.

11. A system for controlling the viscosity of material within a heat exchange chamber, including electrically energizable means associated with said chamber for altering the viscosity of the material, an agitator extending into said chamber and adapted to be rotated within the material, a drive motor for the agitator, a control circuit for connecting a source of electrical power to both said electrically energizable means and said agitator drive motor for energization thereof, said control circuit including a first control element controlling the energization of said agitator drive motor and said electrically energizable means, a second control element controlling the de-energization of said drive motor and said electrically energizable means, and control means responsive to a predetermined torque developed by said agitator drive motor adapted to actuate said second control element, whereby after energization of the drive motor and the electrically energizable means by actuation of said first control element said material must attain a viscosity evidenced by development of said predetermined torque at said drive motor before said second control element is actuated to de-energize said drive motor and said electrically energizable means.

*12. Apparatus for making a liquid into a soft textured semifrozen slush comprising, in combination, tank means having a freezing portion and a feed material portion, means to pass material from said material portion to said freezing portion, an outlet in said freezing portion, refrigeration means mounted and operable relative to said tank means to remove heat passing through the walls thereof in said freezing portion thereof, paddle means mountable in said freezing portion of said tank means, power means operably connected to said paddle means to rotate same and to limitably rotate therewith, means to resist rotation of said power means when mounted and in operation, and switch means operable upon limited rotation of said power means to start and stop the operation of said refrigeration means, said apparatus being constructed and operable to receive liquid in said material portion of said tank means, transfer a portion of same to said refrigeration portion of said tank means and partially freeze same therein to a slush condition and maintain same in a desired slush condition.*

*13. Apparatus for making a partially frozen liquid containing food composition comprising, in combination, tank means with portions for feed material and freezing, refrigeration means mounted and operable relative to said freezing portion of said tank means to remove heat therefrom, paddle means mountable in said freezing portion of said tank means, outlet means in said freezing portion of said tank means, power means operatively connected to said paddle means to turn same in operation, and switch means operatively connected to said refrigeration means to start and stop same, said switch means being connected to be responsive to a change of torque on said paddle means to, in operation, stop and start said refrigeration means when the torque has reached a predetermined value.*

*14. Apparatus for making a liquid into a soft textured semifrozen slush comprising, in combination, tank means having separate freezing and feed material portions, means to move material from said material portion to said freezing portion of said tank means, outlet means in said freezing portion of said tank means, refrigeration means mounted and operable relative to said tank to remove heat from said freezing portion thereof, paddle means mountable in said freezing portion of said tank means, power means operably connected to said paddle means to rotate same, and torque responsive switch means operably connected to said refrigeration means and said paddle means to control said refrigeration means in response to the slush condition in said tank means.*

*15. Apparatus for making a liquid into a soft textured semi-frozen slush comprising, in combination, tank means provided with a freezing portion and a feed material portion, refrigeration means mounted and operable relative to said tank means to remove heat from said tank means, agitator means mounted in said freezing portion of said tank means to turn therein in operation, an outlet in said freezing portion of said tank means and means to pass material from said feed material portion to said freezing portion of said tank means, power means mountable to turn said agitator means and to limitably rotate therewith, means to resist rotation of said power means when mounted and in operation with forces exerted through said agitator means to rotate said power means, and means operable by said power means upon limited rotation of said power means to start and stop said refrigeration means, said apparatus constructed and operable to receive liquid in said feed material portion of said tank means, transfer a portion of same to said freezing portion of said tank means and freeze a portion of same therein to slush condition, and maintain a desired slush condition.*

*16. Apparatus for making a liquid into a soft textured semi-frozen slush comprising, in combination, a freezing chamber provided with inlet means through which material can be introduced into said freezing chamber and outlet means through which the slush formed in the freezing chamber can be removed from said chamber, refrigeration means mounted and operable relative to said freezing chamber to remove heat therefrom, agitator means mountable in the freezing chamber for agitating the slush formed in said chamber, power means operably connected to said agitator means to move the same and to limitably rotate therewith, means to resist rotation of said*

*power means when mounted and in operation with forces exerted through said agitator means to rotate said power means, and means operable by said power means upon limited rotation of said power means to start and stop said refrigeration means, said apparatus constructed and operable to receive liquid in said freezing chamber and freeze a portion of same therein to slush condition, and maintain a desired slush condition.*

References Cited by the Examiner

The following references, cited by the Examiner, are of record in the patented file of this patent or the original patent.

UNITED STATES PATENTS

| | | | |
|---|---|---|---|
| 1,763,567 | 6/30 | Simmons | 62—136 |
| 1,951,365 | 3/34 | Morrow | 62—136 |
| 1,998,841 | 4/35 | Modlin | 62—233 |
| 2,034,213 | 3/36 | Smith | 62—342 |
| 2,102,531 | 12/37 | Hoke | 194—15 |
| 2,446,156 | 7/48 | Kolz | 62—136 |
| 2,536,319 | 1/51 | Slack | 62—136 |
| 2,541,814 | 2/51 | Gaddini | 62—136 |
| 2,559,032 | 7/51 | Tacchella | 62—136 |
| 2,706,385 | 4/55 | Topping | 62—233 |
| 2,734,347 | 2/56 | Fischer | 62—233 |
| 2,766,417 | 10/56 | Merritt | 318—475 |
| 2,808,706 | 10/57 | Updegraff | 62—136 |
| 2,836,038 | 5/58 | Morgan | 62—137 |
| 2,873,584 | 2/59 | Claudy | 62—135 |
| 2,927,440 | 3/60 | Kohl | 62—138 |

FOREIGN PATENTS

| | | |
|---|---|---|
| 142,739 | 9/35 | Austria. |

ROBERT A. O'LEARY, *Primary Examiner.*